US010034131B1

(12) United States Patent
Akhter et al.

(10) Patent No.: US 10,034,131 B1
(45) Date of Patent: *Jul. 24, 2018

(54) SYSTEM AND METHOD FOR A PROXIMITY CORRELATION PLATFORM BASED ON GEOLOCATION INFORMATION

(71) Applicant: Verizon Patent and Licensing Inc., Arlington, VA (US)

(72) Inventors: Shameem Firoz Akhter, Morristown, NJ (US); Michael Douglas Myers, Old Tappan, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,410

(22) Filed: Jan. 19, 2018

Related U.S. Application Data

(63) Continuation of application No. 15/451,816, filed on Mar. 7, 2017, now Pat. No. 9,913,086.

(51) Int. Cl.
*H04W 24/00* (2009.01)
*H04W 4/021* (2018.01)
*H04W 4/02* (2018.01)

(52) U.S. Cl.
CPC .......... *H04W 4/021* (2013.01); *H04W 4/023* (2013.01)

(58) Field of Classification Search
CPC ...... G07C 5/008; G07C 5/0808; G07C 5/085; G07C 9/00111; G07C 2009/0092; G07C 2209/63; G07C 9/00103; G07C 9/00174; H04L 51/12; H04L 63/102; H04L 63/107; H04L 67/26; H04L 41/0246; H04L 41/082; H04M 2250/02; H04M 1/6091; H04M 1/72552; H04M 1/663; H04M 1/72569; H04M 1/72572; H04M 2250/12; H04M 2250/10; H04M 1/72577; H04M 3/42365; H04M 1/6083; H04M 1/72502; H04W 4/02; H04W 64/00; H04W 4/008; G08G 1/0968; G08G 1/0112; G08G 1/0116; G08G 1/012; G08G 1/0962; G08G 1/0969; G08G 1/052; G08G 1/056; G08G 1/065; G08G 1/20; G08G 1/096838; G08G 1/205; G08G 1/207
See application file for complete search history.

(56) References Cited

U.S. PATENT DOCUMENTS

| 2004/0048622 A1 | 3/2004 | Witkowski |
| 2011/0010300 A1 | 1/2011 | Audet |
| 2012/0191511 A1 | 7/2012 | Li |
| 2013/0238167 A1 | 9/2013 | Stanfield |
| 2015/0348178 A1 | 12/2015 | Taylor |

OTHER PUBLICATIONS

Co-pending U.S. Appl. No. 15/451,816, entitled "System and Method for a Proximity Correlation Platform Based on Geolocation Information" by Akhter et al, filed Mar. 7, 2017, 50 pages.

*Primary Examiner* — Nimesh Patel

(57) ABSTRACT

A device may receive, from a server device, information that identifies a user device and information that identifies an object. The device may receive, from the user device, information that identifies a geolocation of the user device. The device may receive information that identifies a geolocation of the object. The device may determine that a proximity condition associated with the user device and the object is satisfied. The device may provide information that identifies that the proximity condition is satisfied to permit an action to be performed in association with the object.

19 Claims, 13 Drawing Sheets

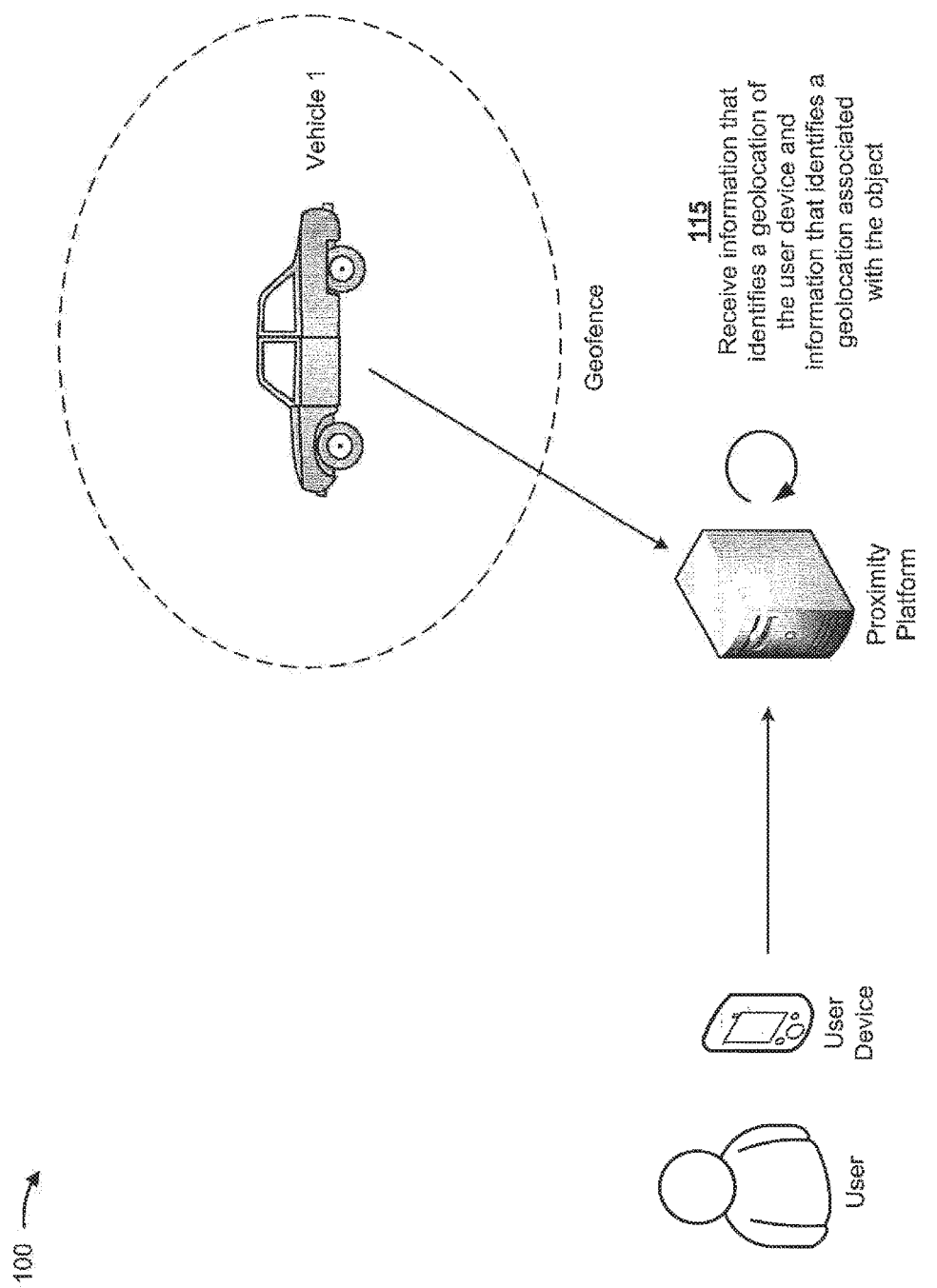

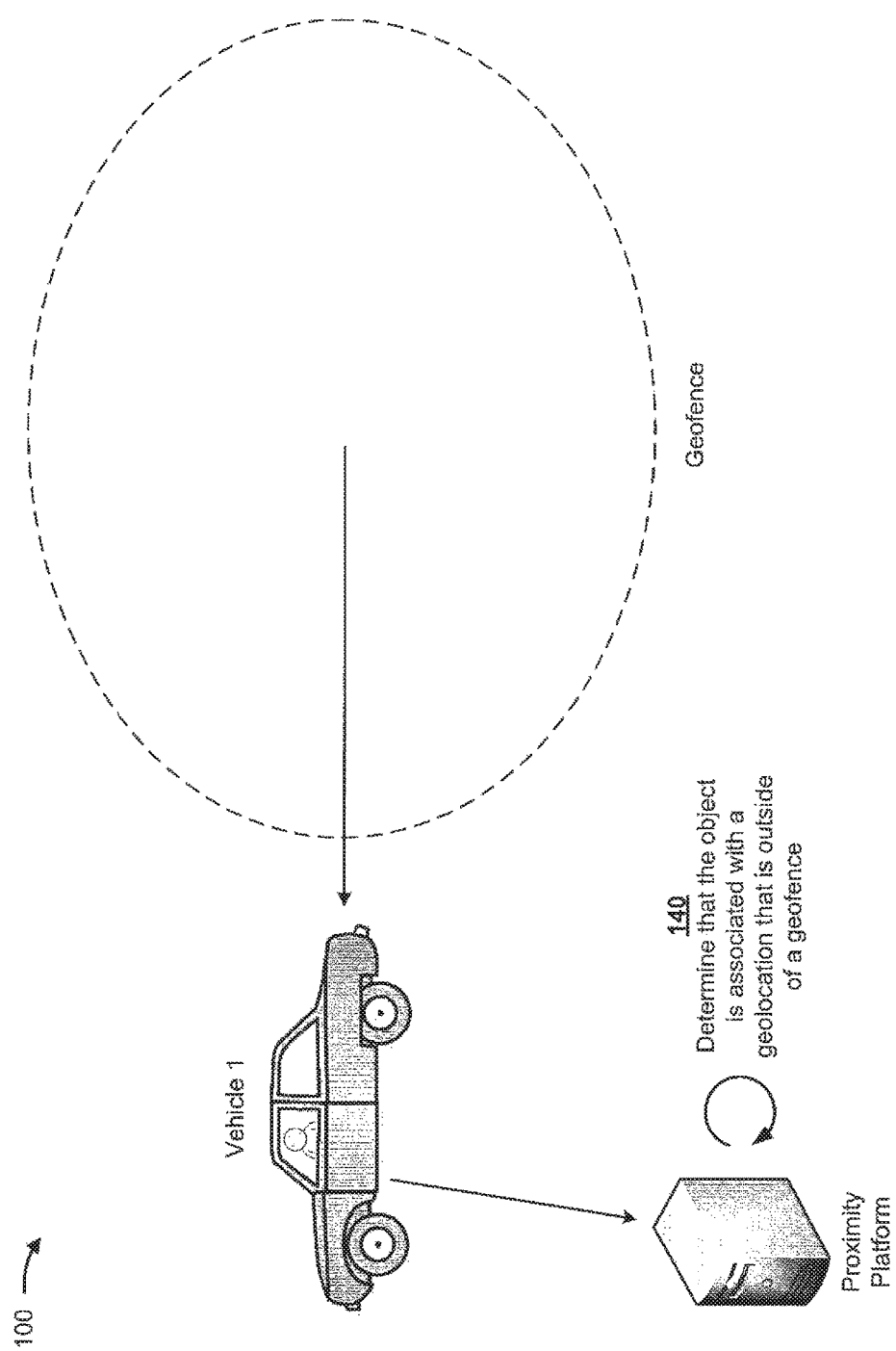

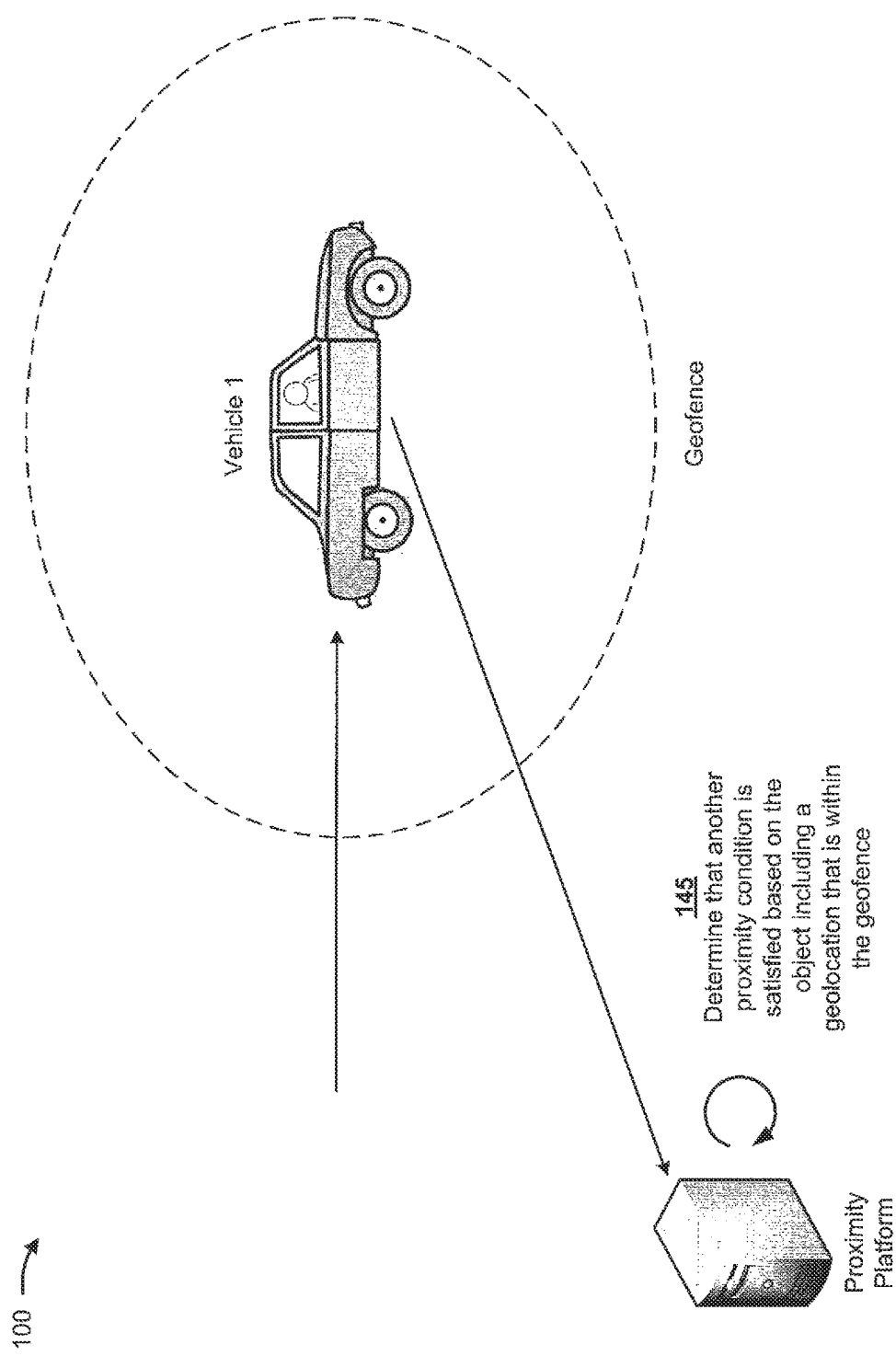

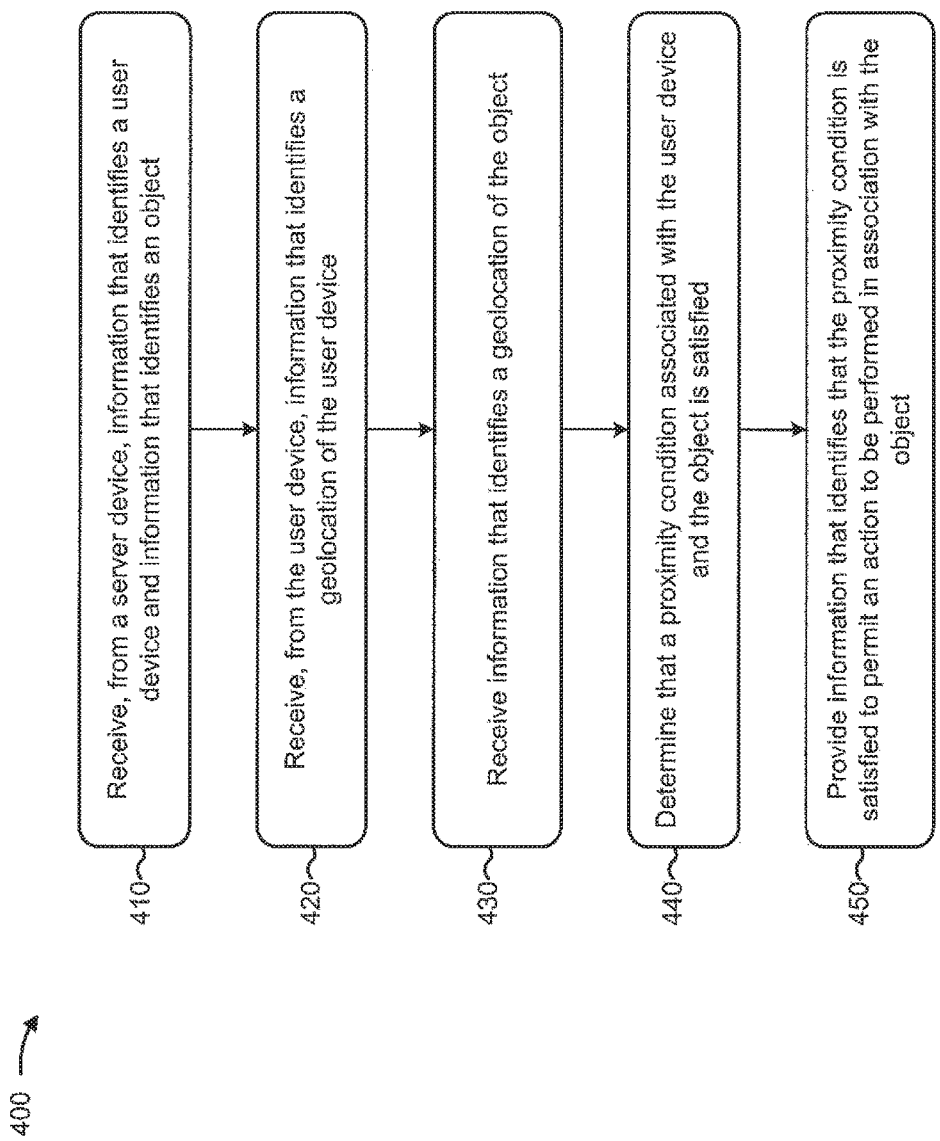

SYSTEM AND METHOD FOR A PROXIMITY CORRELATION PLATFORM BASED ON GEOLOCATION INFORMATION

RELATED APPLICATION

This application is a continuation of U.S. patent application Ser. No. 15/451,816, filed Mar. 7, 2017, which is incorporated herein by reference.

BACKGROUND

A geofence is a virtual perimeter for a real-world geographic area. A geofence may be dynamic (e.g., dynamically generated based on a geolocation of an object) or static, such as corresponding to a pre-defined set of boundaries.

BRIEF DESCRIPTION OF THE DRAWINGS

FIGS. 1A-1J are diagrams of an overview of an example implementation described herein;

FIG. 4 is a flow chart of an example process for performing proximity correlation based on geolocation information.

DETAILED DESCRIPTION OF PREFERRED EMBODIMENTS

The following detailed description of example implementations refers to the accompanying drawings. The same reference numbers in different drawings may identify the same or similar elements.

Determining that a user device is in proximity to an object (e.g., proximity correlation) often requires the user device to interact with the object (e.g., using a quick response (QR) code, near-field communication (NFC), radio-frequency identification (RFID), Bluetooth, or the like). In some cases, such a requirement may prove burdensome on the user, may increase vulnerability of information associated with the user (e.g., based on employing short range communications that are susceptible to security risks), may consume processor and/or memory resources of the user device, may require dedicated hardware (e.g., QR readers, NFC chips, or the like).

Implementations described herein enable a proximity platform to receive information that identifies a user device and receive information that identifies an object (e.g., for which to perform proximity correlation). For example, the proximity platform may receive, from a service or a set of services, information that identifies items for which to perform proximity correlation. Additionally, implementations described herein enable the proximity platform to identify respective geolocations of a user device and an object, determine that a proximity condition is satisfied based on the respective geolocations, and provide information that identifies that the proximity condition is satisfied to cause an action to be performed in association with the object.

For example, the proximity platform may include a self-contained proximity correlation engine (e.g., proximity correlation as a service) that may interact with other services and/or platforms via application programming interfaces (APIs) to receive information that identifies geolocations of user devices, objects, sensor devices such as "Internet of Things" ("IoT") sensors, or the like. Additionally, the proximity platform may perform proximity correlation and provide information to the other services, such that actions can be performed based on the proximity correlation. In this way, services and/or platforms may utilize the proximity correlation service to determine whether proximity conditions are satisfied, thereby enabling actions to be performed based on the proximity conditions. As used herein, proximity correlation may refer to the process of comparing geolocations and/or determining whether proximity conditions are satisfied.

Figure 1A:
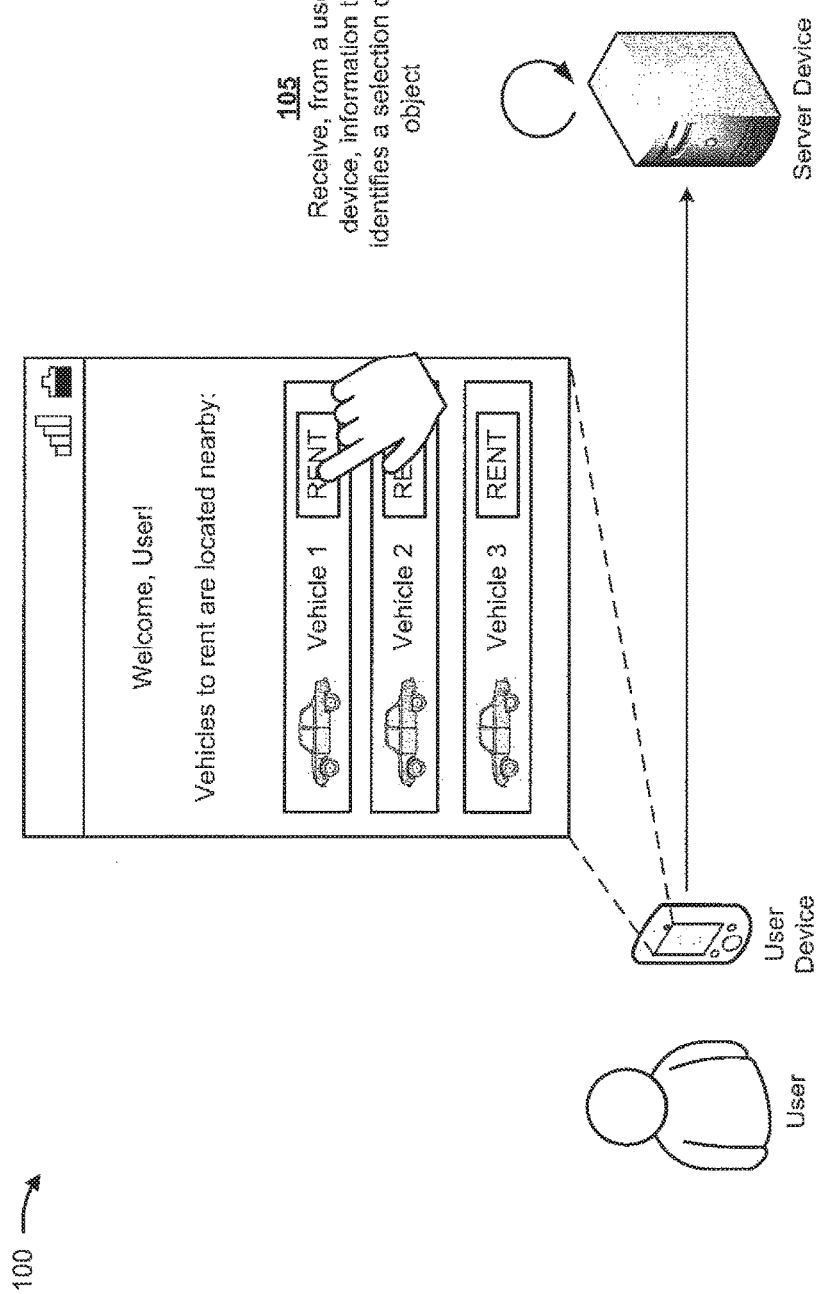

FIGS. 1A-1J are diagrams of an overview of an example implementation 100 described herein. As shown in FIG. 1A, and by reference number 105, a server device may receive, from a user device, information that identifies a selection of an object. For example, an entity may offer vehicles that are available for users to rent. Additionally, the user device may execute an application that enables a user to use a service offered by the entity.

Figure 1B:
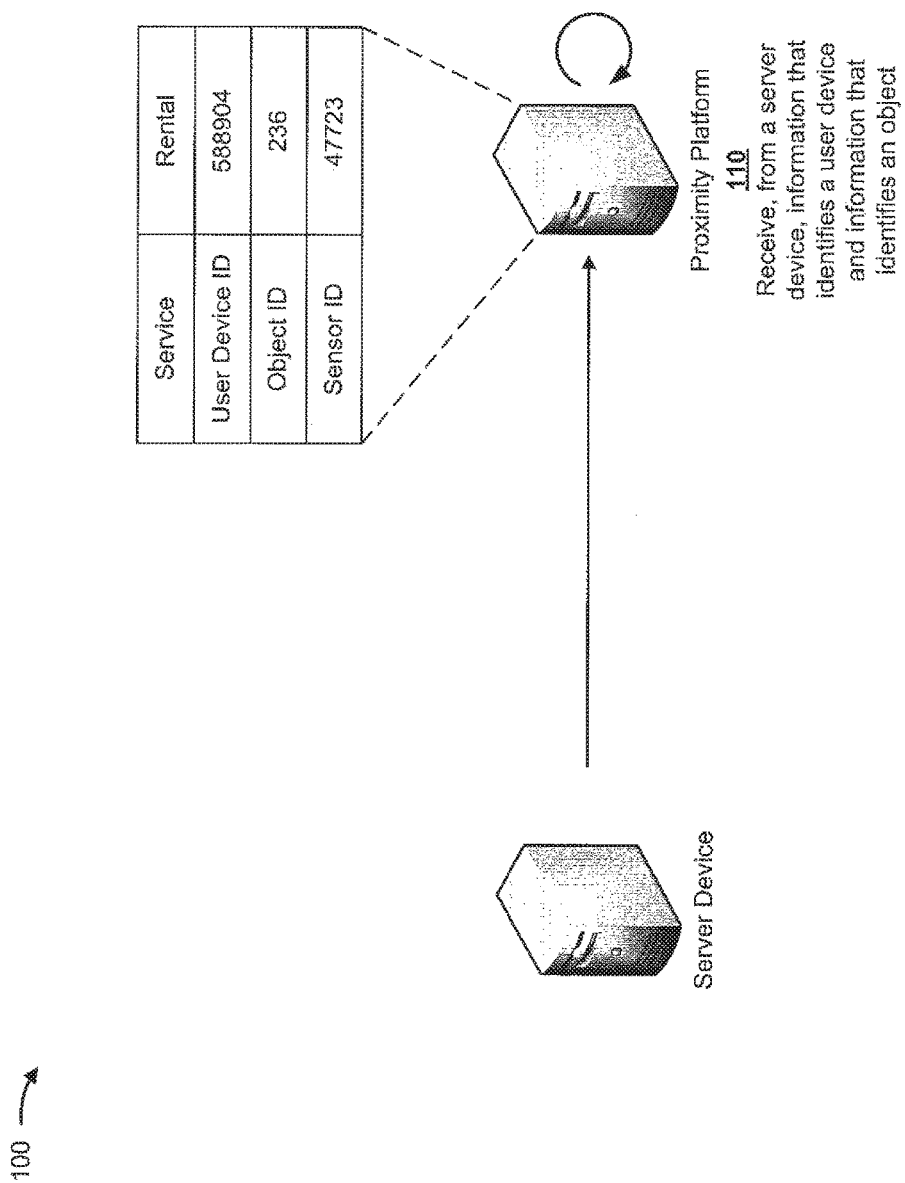

As shown in FIG. 1B, and by reference number 110, a proximity platform may receive, from the server device, information that identifies a user device and information that identifies an object. For example, the proximity platform may provide proximity correlation as a service for third party object owners and/or users. As a particular example, the car rental service may utilize the proximity correlation service offered by the proximity platform. As shown, the proximity platform may receive information that identifies a user device (e.g., associated with the user that selected the vehicle to rent), information that identifies an object (e.g., the selected vehicle), and information that identifies a sensor device (e.g., an IoT sensor associated with the selected vehicle).

As shown in FIG. 1C, and by reference number 115, the proximity platform may receive information that identifies a geolocation of the user device and information that identifies a geolocation associated with the object. In some implementations, and as shown, the object may be associated with a geofence. For example, the geofence may be associated with a static location (e.g., a vehicle rental lot), or may be associated with the object (e.g., dynamically defined based on a geolocation of the object). Regarding example FIGS. 1A-1J, assume that the geofence is associated with a static location. In some implementations, the proximity platform may receive, from the server device, information that identifies the geofence. That is, the entity may specify a particular geofence, and cause the server device to provide, to the proximity platform, information that identifies the geofence for proximity correlation.

Figure 1D:
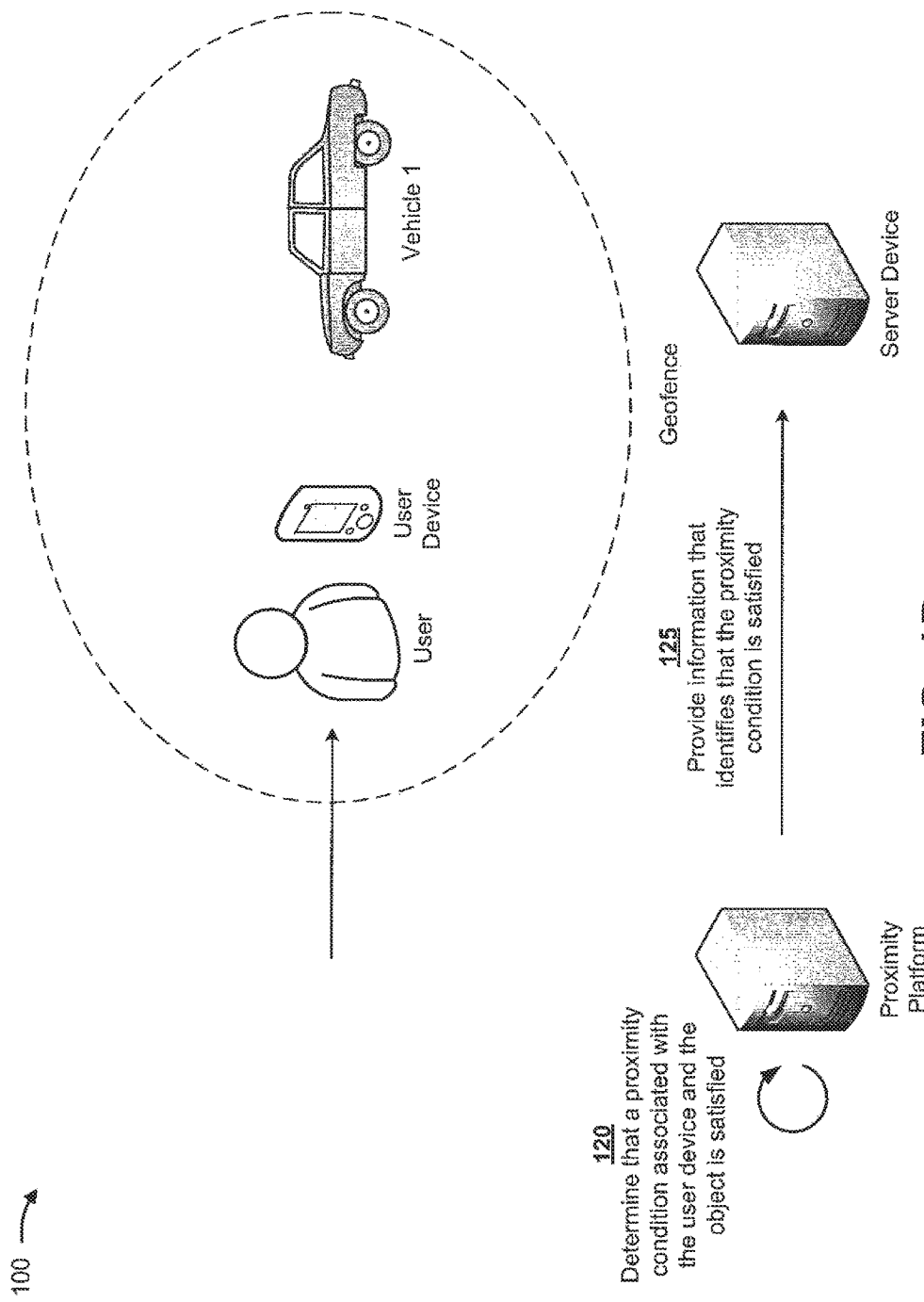

As shown in FIG. 1D, and by reference number 120, the proximity platform may determine that a proximity condition associated with the user device and the object is satisfied. For example, as shown, a geolocation of the user device may be within a perimeter associated with the geofence. In this case, the proximity platform may determine that the proximity condition is satisfied based on the user device being associated with the geolocation that is within the geofence. As further shown in FIG. 1D, and by reference number 125, the proximity platform may provide, to the server device, information that identifies that the proximity condition is satisfied.

Figure 1E:
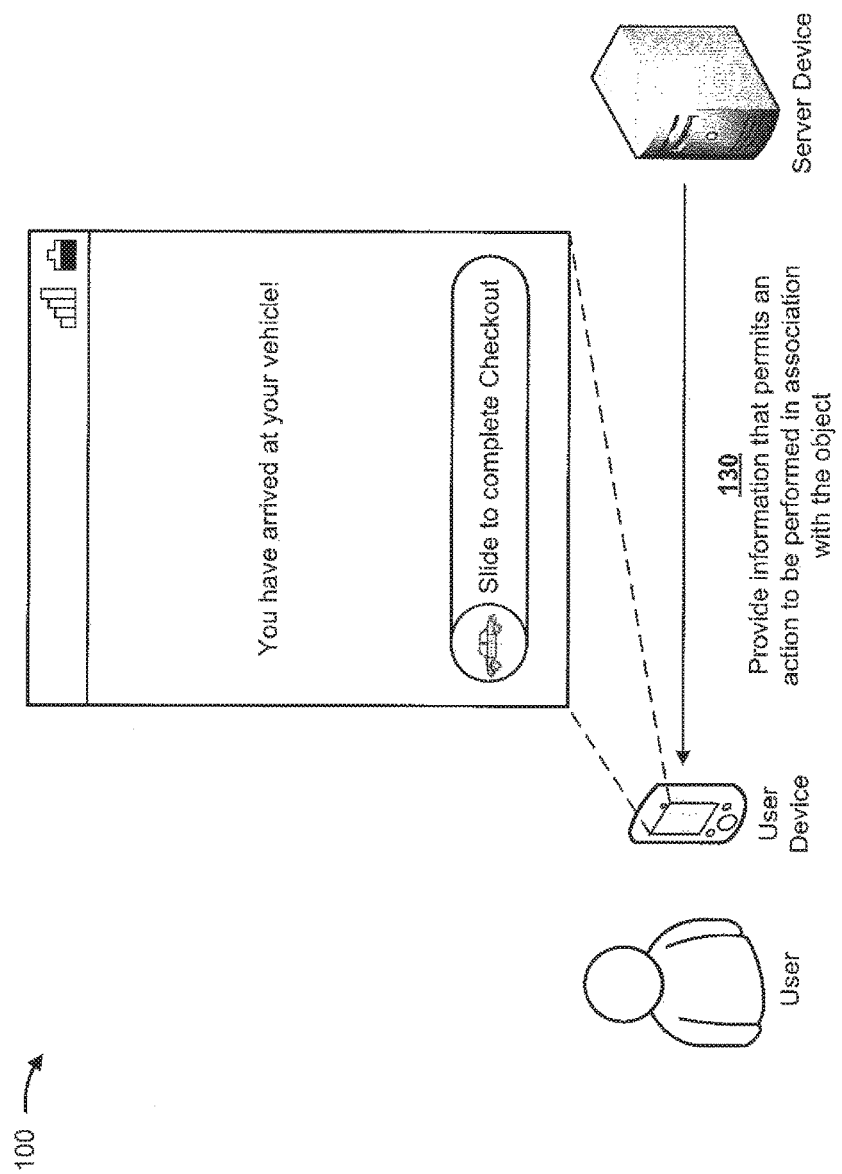

As shown in FIG. 1E, and by reference number 130, the server device may provide information that permits an action to be performed in association with the object. For example, the server device may provide, to the user device, information that identifies that the proximity condition is satisfied to permit an action to be performed in association with the object. As shown, the user device may provide, for display, information that identifies that the object is located nearby, and/or information that provides a prompt for the user to cause an action to be performed.

Figure 1F:
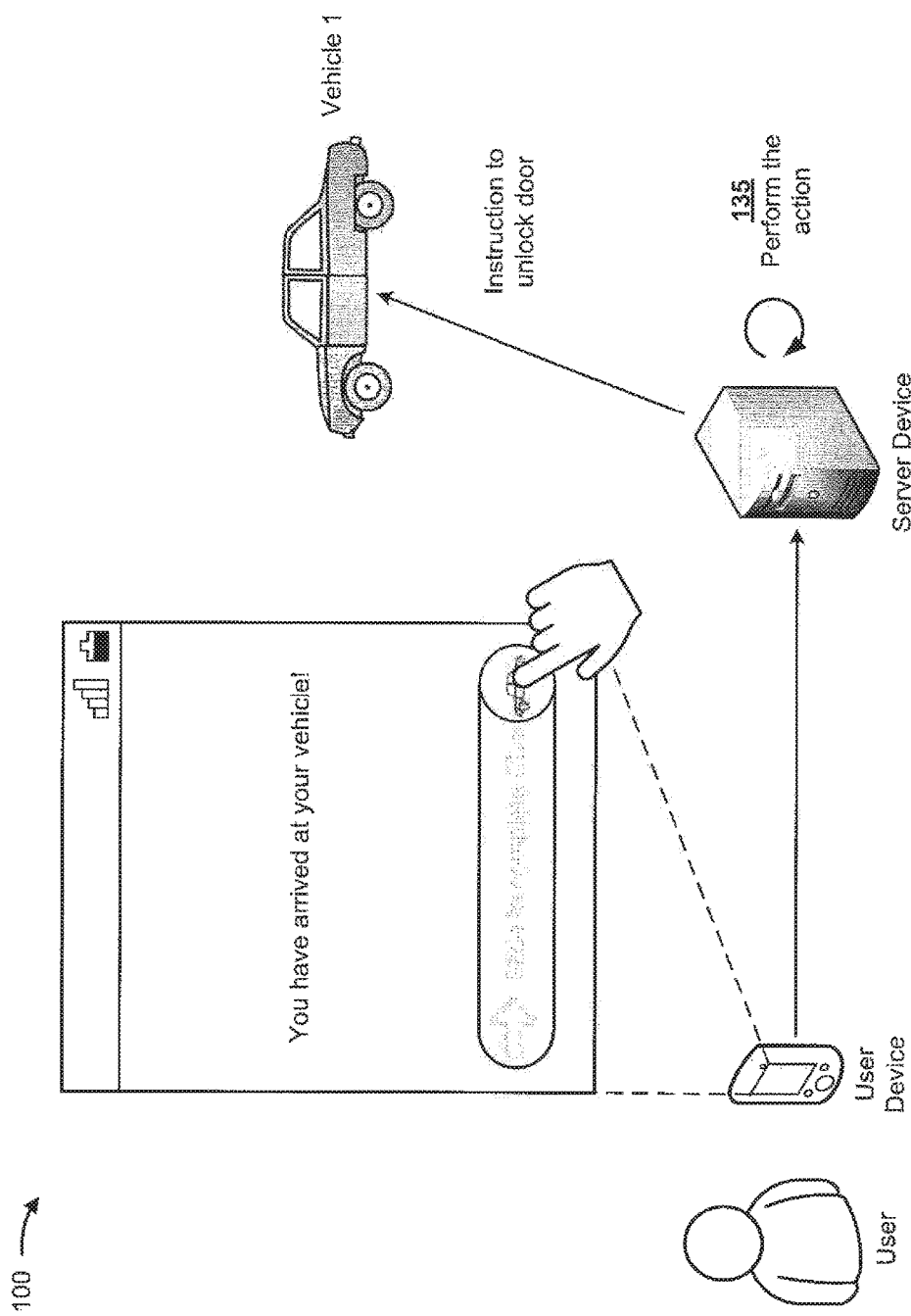

As shown in FIG. 1F, and by reference number 135, the server device may perform the action. As shown, the user may interact with the user device (e.g., perform a swipe touch gesture) that causes the user device to provide, to the server device, information that causes the server device to perform the action. In other implementations, the server device may automatically perform the action based on the proximity condition being satisfied (e.g., without receiving an input from a user).

As an example of an action, the server device may provide, to the vehicle, an instruction that causes the vehicle to unlock a door. In some implementations, a sensor device may be in communication with a system of the vehicle (e.g., an electronic control unit (ECU), or the like), and may receive instructions from the server device (e.g., to unlock a door, enable the engine to start, or the like). In this way, the user may use the vehicle without having to cause the user device to scan a QR code associated with the vehicle, establish an NFC connection, or the like, thereby conserving processor resources, and reducing sensor equipment (e.g., QR readers, NFC chips) of the user device.

As shown in FIG. 1G, and by reference number 140, the proximity platform may determine that the object is associated with a geolocation that is outside of a geofence. For example, assume that the user drives the vehicle such that the vehicle leaves a perimeter defined by the geofence as described above in connection with FIG. 1C.

As shown in FIG. 1H, and by reference number 145, the proximity platform may determine that another proximity condition is satisfied based on the object including a geolocation that is within the geofence. For example, assume that the user intends to return the vehicle (e.g., to the vehicle rental lot). The proximity platform may receive, from the sensor device associated with the vehicle, information that identifies a geolocation of the vehicle. Additionally, the proximity platform may determine that the vehicle includes a geolocation that is within the geofence.

Figure 1I:
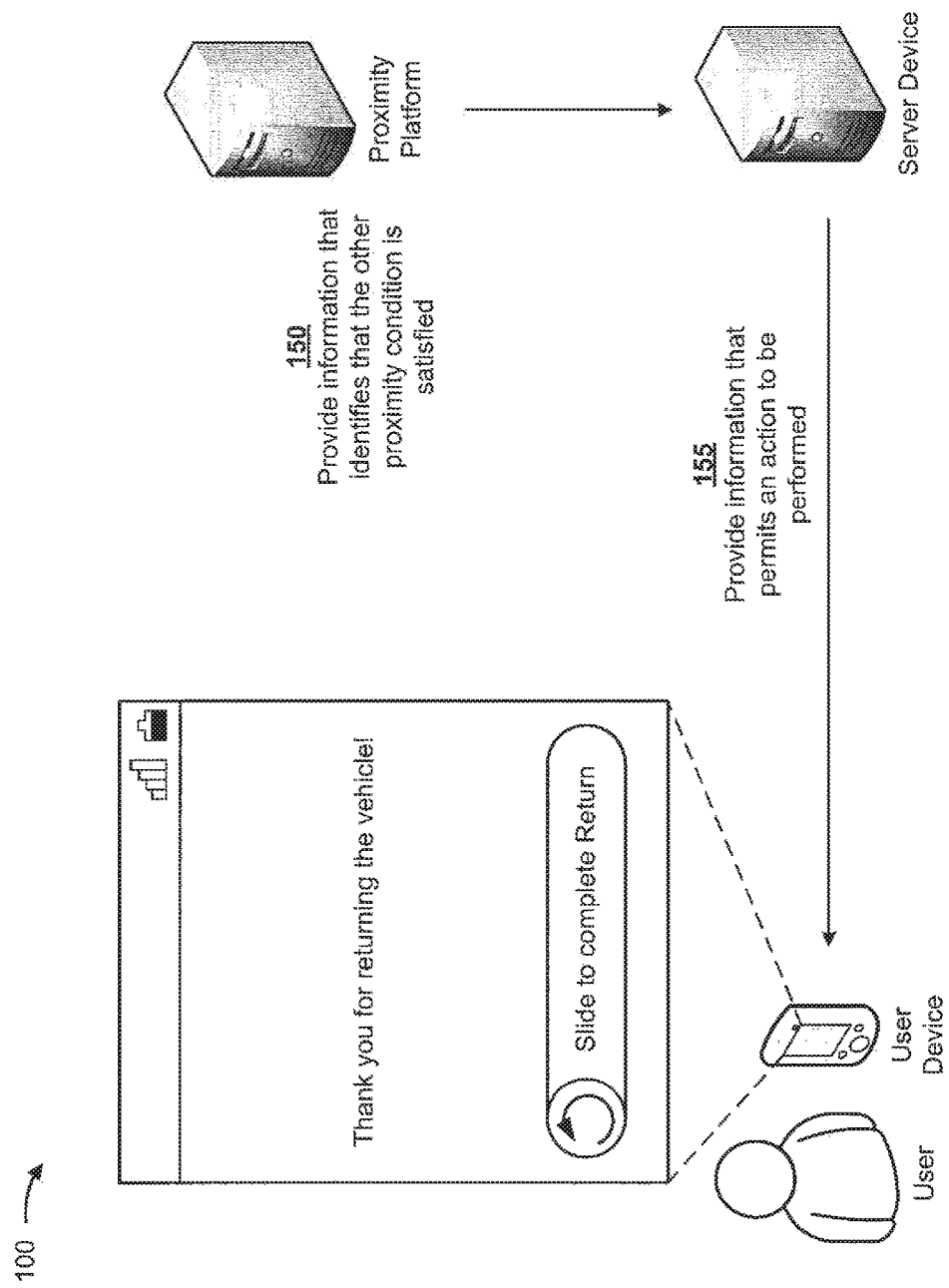

As shown in FIG. 1I, and by reference number 150, the proximity platform may provide, to the server device, information that identifies that the other proximity condition is satisfied. As further shown in FIG. 1I, and by reference number 155, the server device may provide, to the user device, information that permits an action to be performed. For example, the server device may provide, to the user device, information that identifies that the vehicle has been returned to a particular area.

Figure 1J:
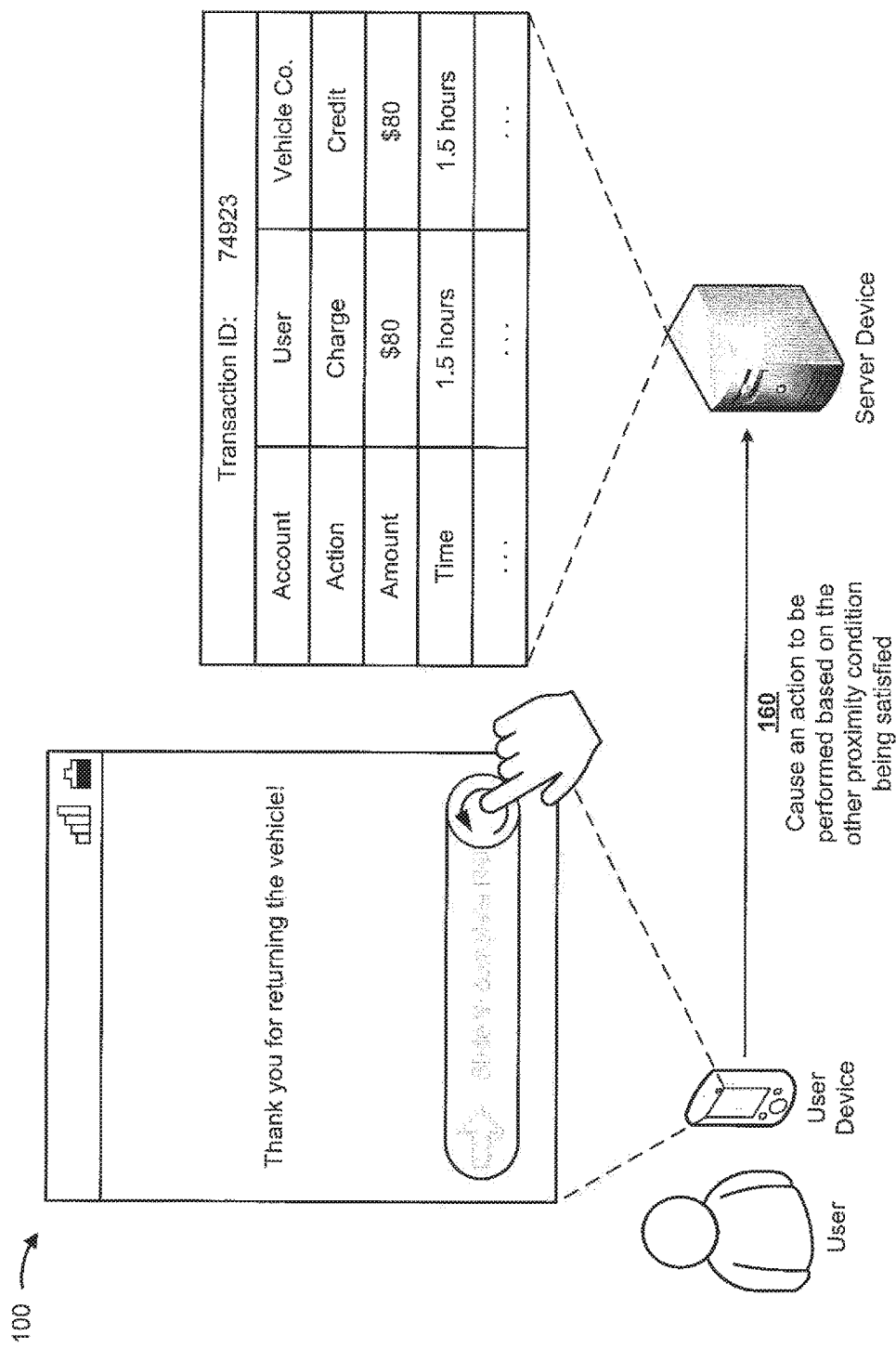

As shown in FIG. 1J, and by reference number 160, the server device may cause an action to be performed based on the other proximity condition being satisfied. As shown, the user may interact with the user device to cause the action to be performed. In other implementations, the server device may automatically cause the action to be performed (i.e., without user input). As shown, the server device may perform the action based on charging an account associated with the user, and crediting an account associated with the entity.

In this way, implementations described herein enable a proximity platform to receive information identifying geolocations of a user device and an object, determine that a proximity condition is satisfied based on the geolocations, and cause actions to be performed based on the proximity condition. For example, the proximity platform may receive, from a service, information that identifies items (e.g., a user device, an object, a sensor device, etc.), and perform proximity correlation based on the items. In other words, the proximity platform may determine whether proximity conditions are satisfied, and provide results to the requesting service(s) such that the requesting service(s) may perform actions based on the proximity conditions being satisfied and/or unsatisfied.

As indicated above, FIGS. 1A-1J are provided merely as an example. Other examples are possible and may differ from what was described with regard to FIGS. 1A-1J.

While implementations herein describe particular objects and/or actions associated with the objects (e.g., renting vehicles, unlocking vehicles, enabling vehicles to operate, or the like), other implementations include other types of objects and/or other types of actions are contemplated. Such actions and objects include purchasing an item, gaining access to a venue, sending an alert based on a proximity of two devices, notifying devices of a proximity condition, enabling boarding of an airplane, or the like.

Additionally, implementations described herein enable a set of services to interact with the proximity platform for proximity correlation. That is, a first service may provide information associated with a first device or object, a second service may provide information associated with a second device or object, etc. Additionally, the set of services may be associated with different entities (e.g., entities that own the objects, entities that provide services to users, etc.). Additionally, the proximity platform may be associated with yet another entity (e.g., an entity that provides proximity correlation as service).

Figure 2:
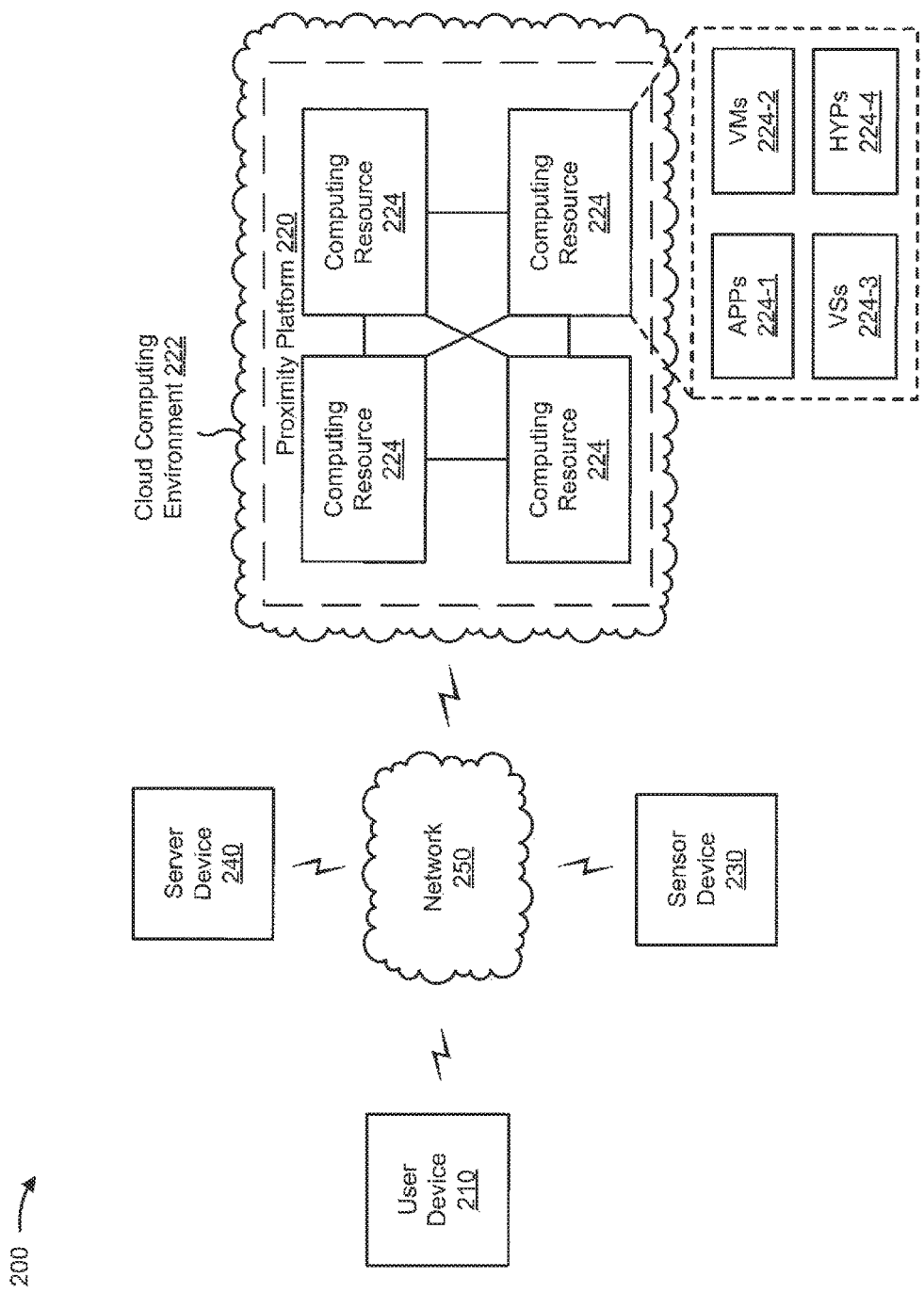
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a proximity platform 220, a sensor device 230, a server device 240, and a network 250. Devices of environment 200 may interconnect via wired connections, wireless connections, or a combination of wired and wireless connections.

User device 210 includes one or more devices capable of receiving, generating, storing, processing, and/or providing information associated with proximity platform 220. For example, user device 210 may include a computing device (e.g., a desktop computer, a laptop computer, a tablet computer, a handheld computer, a server, an autonomous device, an IoT device, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to proximity platform 220. In some implementations, user device 210 may be associated with a user (e.g., receive input from a user, transmit information to proximity platform 220 based on an input, or the like). In other implementations, user device 210 may not be associated with a user (e.g., may operate autonomously, such as without receiving input from a user, or the like).

Proximity platform 220 includes one or more devices capable of determining that proximity conditions are satisfied and performing actions based on the proximity conditions being satisfied, as described elsewhere herein. In some implementations, proximity platform 220 may include a cloud server or a group of cloud servers. In some implementations, proximity platform 220 may be designed to be modular such that certain software components may be swapped in or out depending on a particular need. As such, proximity platform 220 may be easily and/or quickly reconfigured for different uses.

In some implementations, as shown, proximity platform 220 may be hosted in cloud computing environment 222. Notably, while implementations described herein describe proximity platform 220 as being hosted in cloud computing environment 222, in some implementations, proximity platform 220 is not be cloud-based (i.e., may be implemented outside of a cloud computing environment) or may be partially cloud-based.

Cloud computing environment 222 includes an environment that hosts proximity platform 220. Cloud computing environment 222 may provide computation, software, data access, storage, etc. services that do not require end-user (e.g., user device 210, sensor device 230, etc.) knowledge of a physical location and configuration of system(s) and/or device(s) that hosts proximity platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host proximity platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 230. Application 224-1 may eliminate a need to install and execute the software applications on user device 210 and/or sensor device 230. For example, application 224-1 may include software associated with proximity platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine or a series of machines (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210 and/or sensor device 230), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems.

Sensor device 230 includes one or more devices capable of receiving, processing, storing, and/or providing information that identifies a geolocation of an object. In some implementations, sensor device 230 includes one or more machine-to-machine (M2M) devices and/or one or more IoT devices. In other words, sensor device 230 and/or an object associated with sensor device 230 may be any "thing" in the IoT. In some implementations, sensor device 230 may include or be attached to an object, such as a vehicle (e.g., an automobile, heavy equipment, a bicycle, or another type of device/vehicle), a tool, equipment, a device, or the like. In practice, there may be hundreds, thousands, or millions of sensor devices 230 that provide information to server device 240 and/or proximity platform 220.

Server device 240 includes one or more devices capable of receiving, generating, storing, processing, and/or providing information associated with a service. For example, server device 240 can include a server (e.g., a host server, a web server, an application server, etc.), a data center device, or a similar device. In some implementations, server device 240 may be associated with a service that may interact with proximity platform 220 (e.g., via APIs, via a communication protocol, or the like) to utilize a service associated with proximity platform 220.

Network 250 includes one or more wired and/or wireless networks. For example, network 250 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
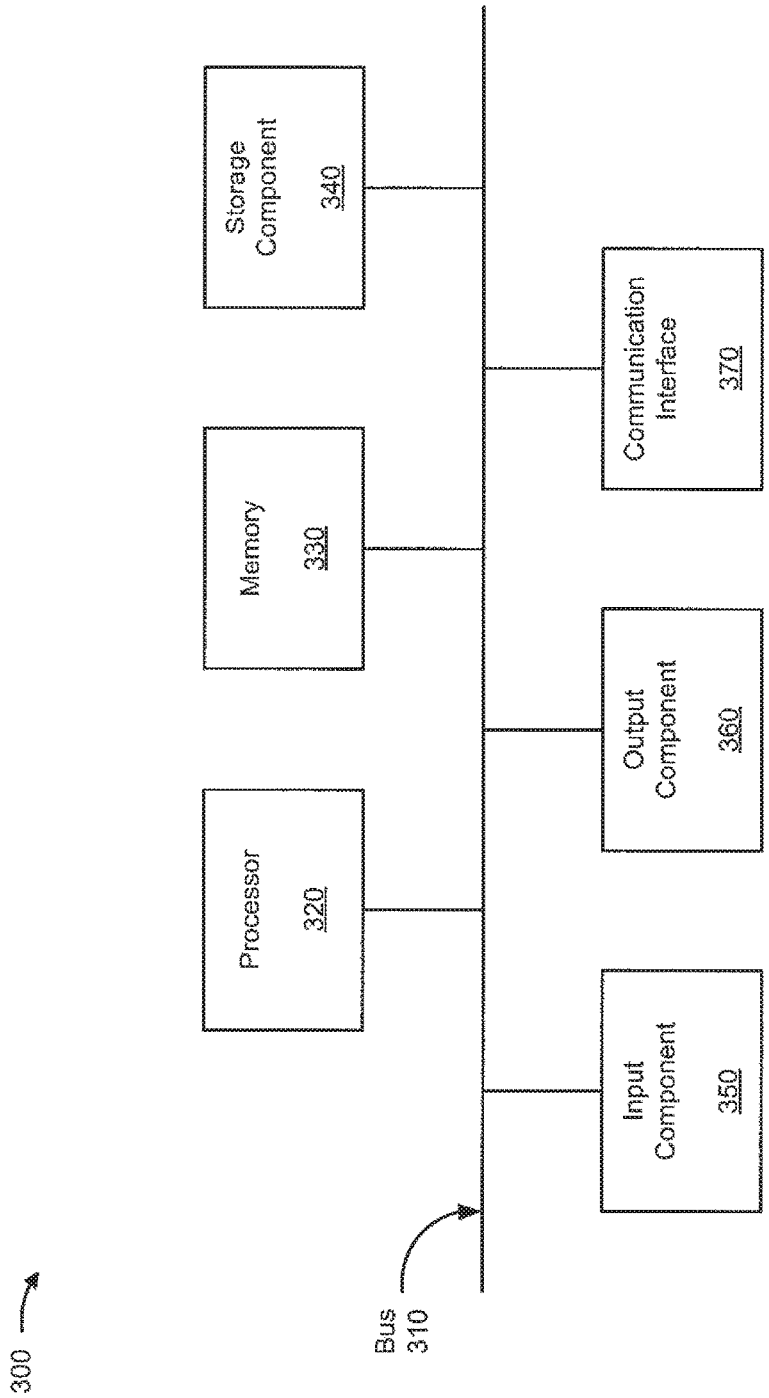
FIG. 3 is a diagram of example components of one or more devices of FIG. 2.

FIG. 3 is a diagram of example components of a device 300. Device 300 may correspond to user device 210, proximity platform 220, sensor device 230, and/or server device 240. In some implementations, user device 210, proximity platform 220, and/or sensor device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for performing proximity correlation based on geolocation information. In some implementations, one or more process blocks of FIG. 4 may be performed by proximity platform 220. In some implementations, one or more process blocks of FIG. 4 may be performed by another device or a group of devices separate from or including proximity platform 220, such as user device 210, sensor device 230, and/or server device 240.

As shown in FIG. 4, process 400 may include receiving, from a server device, information that identifies a user device and information that identifies an object (block 410). For example, proximity platform 220 may receive, from server device 240, information that identifies user device 210 and information that identifies an object. In some implementations, an entity (e.g., an individual, a business, an organization, or the like) may enable other entities (e.g., individuals) to interact with an object, such as rent the object, purchase the object, use the object, access the object, visit the object, or the like. For example, the entity may offer a service that is capable of performing actions based on proximity correlation, as described elsewhere herein. That is, the service may utilize information associated with proximity correlation (e.g., determined by proximity platform 220) to perform particular actions.

In some implementations, user device 210 may execute an application that enables a user to use a service associated with the entity. For example, user device 210 may enable the user to interact with user device 210 to select an object (e.g., to rent the object, to purchase the object, to access the object, to reserve the object, or the like). Additionally, or alternatively, user device 210 may receive an input that identifies a selection of an object. For example, a user may interact with user device 210 to select a particular object. In some implementations, user device 210 may provide, to server device 240, information that identifies the selection of the object based on the user interaction.

In some implementations, an object may include a vehicle (e.g., an automobile, a bicycle, a boat, an all-terrain vehicle, a snowmobile, a golf cart, a plane, heavy equipment, a motorcycle, a scooter, a segway, or the like), a device (e.g., a television, a laptop computer, a gaming device, or the like), equipment, a tool, an attraction (e.g., a movie, a play, an amusement park ride, or the like), a store, a restaurant, a business, or the like.

In some implementations, server device 240 may provide, to proximity platform 220, information that identifies user device 210, an object, sensor device 230 (e.g., associated with the object), a geolocation associated with the object, or the like. For example, server device 240 may provide, to proximity platform 220 via an API, information that enables proximity platform 220 to determine respective geolocations of user device 210 and the object. In some implementations, server device 240 may be associated with a service that interacts with proximity platform 220 to utilize a proximity correlation service that is offered by proximity platform 220. For example, server device 240 may be associated with an entity that is different than an entity that is associated with proximity platform 220. Alternatively, server device 240 and proximity platform 220 may be associated with the same entity and/or service.

In some implementations, server device 240 may provide, to proximity platform 220, information that identifies user device 210 (e.g., a mobile directory number (MDN), an international mobile station equipment identifier (IMEI), a mobile equipment identifier (MEID), an Internet Protocol (IP) address, or the like), or the like. Additionally, or alternatively, server device 240 may provide, to proximity platform 220, information that identifies the object (e.g., an object identifier, a vehicle identification number, or the like) and/or sensor device 230 (e.g., an MDN, an IMEI, an MEID, an IP address, or the like).

In this way, proximity platform 220 may compare a geolocation of user device 210 and a geolocation of an object to determine whether a proximity condition is satisfied, as described elsewhere herein. Additionally, proximity platform 220 may perform proximity correlation by comparing respective geolocations of user device 210 and the object. In this way, services (e.g., that may perform actions based on proximity conditions) may utilize the proximity correlation service offered by proximity platform 220 (e.g., thereby removing a need of the services to receive and/or track geolocations, removing the need of dedicated hardware, or the like).

As further shown in FIG. 4, process 400 may include receiving, from the user device, information that identifies a geolocation of the user device (block 420). For example, proximity platform 220 may receive, from user device 210, information that identifies a geolocation of user device 210. In some implementations, proximity platform 220 may receive the information that identifies the geolocation of user device 210 based on the information that identifies user device 210 (e.g., may request the information from user device 210, may request the information from another device, or the like).

In some implementations, user device 210 may include functionality for determining a geolocation of user device 210. For example, user device 210 may utilize GPS information, compass information, accelerometer information, signal triangulation, and/or the like to determine a geolocation of user device 210. Additionally, or alternatively, user device 210 may establish a connection (e.g., a wireless local area network (WLAN) connection, an NFC connection, etc.) with another device (e.g., a smart kiosk, such as a WLAN access point, or the like), and provide the geolocation information based on establishing the connection.

As further shown in FIG. 4, process 400 may include receiving information that identifies a geolocation of the object (block 430). For example, proximity platform 220 may receive information that identifies a geolocation of the object. In some implementations, proximity platform 220 may determine a geolocation of sensor device 230 and/or the object based on the information that identifies the object and/or sensor device 230. For example, proximity platform 220 may request information that identifies the geolocation, may search a data structure, or the like.

In some implementations, sensor device 230 may provide, to proximity platform 220, information that identifies a geolocation of sensor device 230 (e.g., geographic coordinates, or the like). For example, sensor device 230 may be affixed to an object. In this case, proximity platform 220 may receive information that identifies a geolocation of the object based on the geolocation of sensor device 230. In some implementations, sensor device 230 may be associated with an object, such as by being located within a threshold distance of the object. In this case, sensor device 230 may identify a geolocation of an object (e.g., a location where the object may be located, a location where the object is to be returned, or the like).

In this way, proximity platform 220 may compare respective geolocations of user device 210 and the object, and determine whether a proximity condition is satisfied, as described elsewhere herein. In some implementations, different server devices 240, services, and/or entities may be associated with user device 210, the object, and/or sensor device 230.

As further shown in FIG. 4, process 400 may include determining that a proximity condition associated with the user device and the object is satisfied (block 440). For example, proximity platform 220 may determine that a proximity condition associated with user device 210 and the object is satisfied. In some implementations, a proximity condition may refer to a condition that is associated with user device 210 being within a threshold distance of an object, sensor device 230, a geofence (e.g., within the geofence), a particular location, or the like.

In some implementations, proximity platform 220 may determine that the proximity condition is satisfied based on user device 210 including a geolocation that is within a threshold distance of a geolocation of the object. For example, proximity platform 220 may receive information that identifies a geolocation of user device 210, and receive information that identifies a geolocation associated with the object. Additionally, or alternatively, proximity platform 220 may determine, based on the respective geolocations, a distance between the object and user device 210. Additionally, or alternatively, proximity platform 220 may determine that the distance satisfies a threshold, and determine that the proximity condition is satisfied based on the distance satisfying the threshold.

In some implementations, proximity platform 220 may receive, from server device 240, information that identifies a threshold distance, a geofence, a geolocation, or the like. For example, an entity (e.g., associated with server device 240) may specify the information that identifies the threshold distance, the geofence, the geolocation, or the like, and cause server device 240 to provide the information to proximity platform 220. In some implementations, proximity platform 220 may identify the threshold distance, the geofence, and/or the geolocation based on stored information (e.g., by searching a data structure, by requesting the information from another device, or the like). That is, particular services may be associated with different information that is to be used in association with proximity correlation (e.g., different threshold distances, different geofences, or the like).

In some implementations, proximity platform 220 may determine that the proximity condition is satisfied based on user device 210 including a geolocation that is within a geofence. In some implementations, a geofence may refer to a set of geographic coordinates that define an area (e.g., a perimeter, a boundary, etc.). For example, a geofence may include a set of points (e.g., geographic coordinates, geographic locations, or the like) that define a perimeter, where the perimeter includes a center and a radius. Alternatively, the geofence may include a set of points that define another geometric shape or pattern (e.g., a square, a triangle, a pentagon, etc.).

In some implementations, proximity platform 220 may identify information associated with the geofence based on sensor device 230. For example, in cases where sensor device 230 is affixed to the object, a geolocation of sensor device 230 may correspond to a geolocation of the object. Additionally, or alternatively, proximity platform 220 may determine a geofence based on the geolocation of sensor device 230. That is, the geofence may dynamically change based on a change in geolocation of sensor device 230. As a particular example, a center of the geofence may correspond to the geolocation of sensor device 230. Alternatively, as described above, the geofence may correspond to another geometric shape (i.e., any set of points enclosed by a set of lines).

In some implementations, proximity platform 220 may determine that the proximity condition is satisfied based on user device 210 and sensor device 230 including respective geolocations that are within a geofence. For example, assume that sensor device 230 is affixed to the object. In this case, proximity platform 220 may determine that both user device 210 and sensor device 230 are located within the geofence, and determine that the proximity condition is satisfied based on both user device 210 and sensor device 230 including geolocations that are within the geofence. As an example, assume that the object is stored in association with a particular location (e.g., a vehicle rental lot). Additionally, assume that the geofence is associated with the particular location. In this case, the proximity condition may be satisfied based on user device 210 and sensor device 230 being associated with geolocations that are within the geofence (e.g., the selected object is at the particular location).

In some implementations, proximity platform 220 may determine that a proximity condition is satisfied based on a geolocation of user device 210 being within a threshold distance of sensor device 230, being within a geofence, etc. for a threshold amount of time, based on a velocity of user device 210, based on an orientation of user device 210, or the like. In this way, proximity platform 220 may reduce a number of false positives (e.g., situations where an action is performed despite an intent of the user for an action not to occur).

In this way, proximity platform 220 may provide information that identifies that the proximity condition is satisfied to permit and/or cause an action to be performed in association with the object, as described elsewhere herein.

As further shown in FIG. 4, process 400 may include providing information that identifies that the proximity condition is satisfied to permit an action to be taken in association with the object (block 450). For example, proximity platform 220 may provide information that identifies that the proximity condition is satisfied to permit an action to be performed in association with the object. In some implementations, proximity platform 220 may provide, to a service or a set of services, information that identifies that the proximity condition is satisfied to permit the service(s) to perform an action.

As a particular example, assume that the user of user device 210 is renting a vehicle. In this case, user device 210 may provide, for display, information that prompts the user to complete a checkout of the vehicle. Additionally, user device 210 may receive an input and provide, to server device 240, information that causes the action to be performed (e.g., a checkout process to be completed).

In some implementations, proximity platform 220 may provide, to server device 240, information that identifies that the proximity condition is satisfied to cause an account to be modified. For example, server device 240 may cause an account, associated with a user of user device 210, to be charged based on the proximity condition being satisfied. Additionally, or alternatively, server device 240 may cause an account, of an entity associated with the object, to be credited based on the proximity condition being satisfied.

In some implementations, proximity platform 220 and/or server device 240 may provide, to sensor device 230, information that identifies that the proximity condition is satisfied to cause sensor device 230 to perform an action in association with the object. For example, sensor device 230 may perform an action that enables a user to interact with the object (e.g., access the object, remove the object from a particular area, use the object, or the like). As a particular example, assume that the object is a vehicle. In this case, sensor device 230 may be associated with the vehicle, and/or may be capable of communicating with one or more vehicle communication networks (VCNs) and/or control devices associated with the vehicle (e.g., an electronic control unit (ECU), an engine control module (ECM), or the like) to unlock the vehicle, permit the vehicle to be started, or the like. Additionally, in this case, proximity platform 220 and/or server device 240 may provide, to sensor device 230, an instruction that causes sensor device 230 to perform the action in association with the vehicle (e.g., unlock the vehicle, permit the vehicle to be started, or the like).

In some implementations, proximity platform 220 may determine that another proximity condition is satisfied, and provide information that identifies that the other proximity condition is satisfied to permit and/or cause another action to be performed. For example, assume that a user, of user device 210, rents a vehicle, and that the user removes the vehicle from an area defined by a geofence. Additionally, assume that the user returns the vehicle to the area defined by the geofence. In this case, proximity platform 220 may determine that sensor device 230 (e.g., associated with the vehicle) and/or user device 210 is associated with a geolocation that is located within the geofence, and determine that another proximity condition is satisfied (e.g., that the user has returned the vehicle).

In some implementations, proximity platform 220 may determine a time frame (e.g., an amount of time) for which the object is associated with a geolocation that is not located within the geofence, and perform an action based on the time frame (e.g., cause an account to be charged based on the time frame, or the like). Additionally, or alternatively, proximity platform 220 may determine a time frame for which a distance between the object and user device 210 satisfies a threshold, and cause an action to be performed based on the time frame. Additionally, or alternatively, proximity platform 220 may perform an action based on another type of metric, such as a total distance traveled by user device 210 and/or sensor device 230, an amount of time that user device 210 and/or sensor device 230 are associated with a particular geolocation, user device 210 and/or sensor device 230 being associated with a particular geolocation, a velocity (e.g., a maximum velocity, an average velocity, or the like) of sensor device 230, or the like.

In some implementations, proximity platform 220 may provide, to multiple server devices 240, information that identifies that the proximity condition is satisfied. For example, proximity platform 220 may provide the information to different services that may utilize the information to cause actions to be performed.

In this way, implementations described herein enable proximity platform 220 to determine, based on respective geolocations of user device 210 and sensor device 230, that a proximity condition is satisfied. Additionally, implementations described herein enable proximity platform 220 to automatically cause an action to be performed in association with an object based on the proximity condition being satisfied. In this way, implementations described herein reduce a need of user device 210 to interact with an object (e.g., scan a QR code associated with the object, establish a connection with the object, or the like), reduce a need of a user to interact with user device 210 to cause an action to be performed, or the like. In this way, implementations described herein improve user experience, improve security of personal information (e.g., by reducing a need for short range communications that may be vulnerable to tampering), conserve processor and/or memory resources of user device 210 (e.g., by reducing an amount of user interaction), or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A computer-device associated with a proximity platform, comprising:
   one or more memories; and
   one or more processors, communicatively coupled to the one or more memories, to:
   receive, from a server, information that identifies an identifier of a wireless user device and information that identifies an identifier of an object of interest to a user,
   the object of interest to a user being selected from a list of objects of interest to the user available proximal to the wireless user device;
   receive, at the computer-device, information that identifies a first geolocation of the wireless user device and information that identifies a geolocation of the object of interest to the user;
   determine that a proximity condition associated with the wireless user device and the object of interest to the user is satisfied based on the information that identifies the first geolocation of the wireless user device and the information that identifies the geolocation of the object of interest to the user;

provide, based on the determining, information that identifies that the proximity condition is satisfied, to permit an action, by the server device, and based on the proximity condition, to be performed in association with the wireless user device or the object of interest to the user;
the action selected from one of the following:
  permitting access to the object;
  causing an account of the user of the user device to be modified;
  crediting an account associated with the object;
  enabling the object to operate;
  unlocking the object; and
  managing an inventory system associated with the object.

2. The computer-device of claim 1, where a sensor device is affixed to the object of interest to a user,
the sensor device to provide the information that identifies the second geolocation of the object.

3. The device of claim 2, where the second geolocation of the object of interest to a user dynamically changes based on a change in a third geolocation of the sensor device.

4. The computer-device of claim 1, where the one or more processors are further to:
determine that the first geolocation of the wireless user device is within a geofence associated with the object of interest to the user; and
where the one or more processors, when determining that the proximity condition is satisfied, are to:
  determine that the proximity condition is satisfied based on the first geolocation being within the geofence.

5. The computer-device of claim 1, where the one or more processors are further to:
determine that the first geolocation of the wireless user device is within a geofence associated with the object of interest to the user;
determine at least one of:
  a threshold amount of time the wireless user device is within the geofence,
  a velocity of the wireless user device, or
  an orientation of the wireless user device; and
where the one or more processors, when determining that the proximity condition is satisfied, are to:
  determine that the proximity condition is satisfied based on the first geolocation being within the geofence and at least one of:
    the threshold amount of time the wireless user device is within the geofence,
    the velocity of the wireless user device, or
    the orientation of the wireless user device.

6. The computer-device of claim 1, where the one or more processors are further to:
determine that another proximity condition is satisfied; and
cause another action of interest to the user to be performed based on the other proximity condition being satisfied.

7. A non-transitory computer-readable medium storing instructions, the instructions comprising:
one or more instructions that, when executed by one or more processors, cause the one or more processors to:
  receive, from a server, information that identifies an identifier of a wireless user device and information that identifies an identifier of an object of interest to a user,
    the object of interest to the user being selected from a list of objects of interest to the user available proximal to the user device;
  receive information that identifies a first geolocation of the wireless user device and information that identifies a geolocation of the object of interest to the user,
  determine that a proximity condition associated with the wireless user device and the object of interest to the user is satisfied based on the information that identifies the first geolocation of the wireless user device and the information that identifies the geolocation of the object of interest to the user;
  provide based on the determining, information that identifies that the proximity condition is satisfied to permit an action, and based on the proximity condition, to be performed in association with the wireless user device or the object of interest to the user,
  the action selected from one of the following:
    permitting access to the object;
    causing an account of the user of the user device to be modified;
    crediting an account associated with the object;
    enabling the object to operate;
    unlocking the object; and
    managing an inventory system associated with the object.

8. The non-transitory computer-readable medium of claim 7, where the one or more instructions, when executed by the one or more processors, further cause the one or more processors to:
determine that the first geolocation of the wireless user device and a third geolocation of a sensor device are within a geofence,
  the sensor device being associated with the object of interest to the user; and
where the one or more instructions, that cause the one or more processors to determine that the proximity condition is satisfied, cause the one or more processors to:
  determine that the proximity condition is satisfied based on the first geolocation and the third geolocation being within the geofence.

9. The non-transitory computer-readable medium of claim 7, where the one or more instructions, when executed by the one or more processors, further cause the one or more processors to:
identify a time frame associated with the proximity condition being satisfied; and
where the one or more instructions, that cause the one or more processors to provide the information that identifies that the proximity condition is satisfied to cause the action to be performed in association with the object of interest to the user, cause the one or more processors to:
  provide the information to cause the action to be performed based on the time frame.

10. The non-transitory computer-readable medium of claim 7, where the one or more instructions, when executed by the one or more processors, further cause the one or more processors to:
determine a geofence associated with the object of interest to the user;
determine that the first geolocation of the wireless user device is within the geofence; and
where the one or more instructions, that cause the one or more processors to determine that the proximity condition is satisfied, cause the one or more processors to:

determine that the proximity condition is satisfied based on the first geolocation of the wireless user device being within the geofence.

11. The non-transitory computer-readable medium of claim 7, where the one or more instructions, when executed by the one or more processors, further cause the one or more processors to:
    determine a geofence associated with the object of interest to the user;
    determine that the first geolocation of the wireless user device is within the geofence; and
    determine at least one of:
        a threshold amount of time the wireless user device is within the geofence,
        a velocity of the wireless user device, or
        an orientation of the wireless user device; and
    where the one or more instructions, that cause the one or more processors to determine that the proximity condition is satisfied, cause the one or more processors to:
        determine that the proximity condition is satisfied based on the first geolocation of the wireless user device being within the geofence and at least one of:
            the threshold amount of time the wireless user device is within the geofence,
            the velocity of the wireless user device, or
            the orientation of the wireless user device.

12. The non-transitory computer-readable medium of claim 7, where a sensor device is affixed to the object of interest to the user,
    the sensor device to provide the information that identifies the second geolocation of the object of interest to the user.

13. The non-transitory computer-readable medium of claim 12, where the second geolocation of the object of interest to the user dynamically changes based on a change in a third geolocation of the sensor device.

14. A method, comprising:
    receiving, by a computer-device and from a server, information that identifies an identifier of a wireless user device and information that identifies an identifier of an object of interest to a user,
        the computer-device being associated with a proximity platform,
        the object of interest to the user being selected from a list of objects of interest to the user available proximal to the wireless user device;
        receiving, at the computer device, information that identifies a first geolocation of the wireless user device, and information that identifies a geolocation of the object of interest to the user,
    determining that a proximity condition associated with the wireless user device and the object of interest to the user is satisfied based on the information that identifies the first geolocation of the wireless user device and the information that identifies the geolocation of the object of interest to the user;
    providing, by the device, based on the determining, information that identifies that the proximity condition is satisfied to permit an action by the server device, and based on the proximity condition, to be performed in association with the object of interest to the user or the wireless device;
    the action selected from one of the following:
        permitting access to the object;
        causing an account of the user of the user device to be modified;
        crediting an account associated with the object;
        enabling the object to operate;
        unlocking the object; and
        managing an inventory system associated with the object.

15. The method of claim 14, further comprising:
    receiving, from the server, information that identifies a sensor device,
        the sensor device being associated with the object of interest to the user;
    requesting the information that identifies the second geolocation based on the information that identifies the sensor device; and
    where receiving the information that identifies the second geolocation of the object of interest to the user comprises:
        receiving the information that identifies the second geolocation of the object of interest to the user based on requesting the second geolocation information.

16. The method of claim 15, where the second geolocation of the object of interest to the user dynamically changes based on a change in a third geolocation of the sensor device.

17. The method of claim 14, further comprising:
    determining a time frame for which the proximity condition is satisfied; and
    where providing the information that identifies that the proximity condition is satisfied comprises:
        providing the information that identifies that the proximity condition is satisfied to cause the action to be performed based on the time frame.

18. The method of claim 14, further comprising:
    identifying a geofence associated with the object of interest to the user;
    determining that the first geolocation of the object of interest to the user is within the geofence; and
    where determining that the proximity condition is satisfied comprises:
        determining that the proximity condition is satisfied based on the first geolocation being within the geofence.

19. The method of claim 14, further comprising:
    identifying a geofence associated with the object of interest to the user;
    determining that the first geolocation of the object of interest to the user is within the geofence;
    determining at least one of:
        a threshold amount of time the wireless user device is within the geofence,
        a velocity of the wireless user device, or
        an orientation of the wireless user device; and
    where determining that the proximity condition is satisfied comprises:
        determining that the proximity condition is satisfied based on the first geolocation being within the geofence and at least one of:
            the threshold amount of time the wireless user device is within the geofence,
            the velocity of the wireless user device, or
            the orientation of the wireless user device.

* * * * *